May 6, 1958     C. CONIGLIARO     2,833,039

COMBINATION PROTRACTOR AND COMPASS

Filed Feb. 18, 1954

*INVENTOR.*
CARMEN CONIGLIARO
BY Howard J. Whelan.
ATTORNEY

United States Patent Office 2,833,039
Patented May 6, 1958

2,833,039

COMBINATION PROTRACTOR AND COMPASS

Carmen Conigliaro, Pasadena, Md., assignor of one-half to George B. Stevens, Jr., Milford, Md.; Anna R. Conigliaro, administratrix of said Carmen Conigliaro, deceased Application February 18, 1954, Serial No. 411,121

5 Claims. (Cl. 33—26)

This invention relates to measuring instruments and more particularly to a combination protractor and compass.

The conventional draftsman or template layout man in performing his work requires the use of a compass, a bevel protractor, square and scriber, all are used separately and contribute to the many errors made during their use. It is an object of this invention to provide a single instrument having the functions of a compass, bevel protractor, square scriber and T-square etc.

A further object of this invention is to provide a new and improved protractor with sliding scales located to form a protractor, straight edge, T-square and compass and be easily adjustable and simple in its operation.

A further object of this invention is to provide a new and improved combination instrument that can be used as a compass, protractor, straight edge and T-square that will avoid one or more of the disadvantages and limitations of the previous art.

Other objects will become apparent as the invention is more fully set forth.

For a better understanding of the invention and its objects, reference is made to the accompanying drawings, which in conjunction with the following description outline a particular form of the invention by way of example while the claims emphasize the scope thereof.

In the drawings.

Similar reference characters relate to similar parts throughout the drawings.

Figure 1:
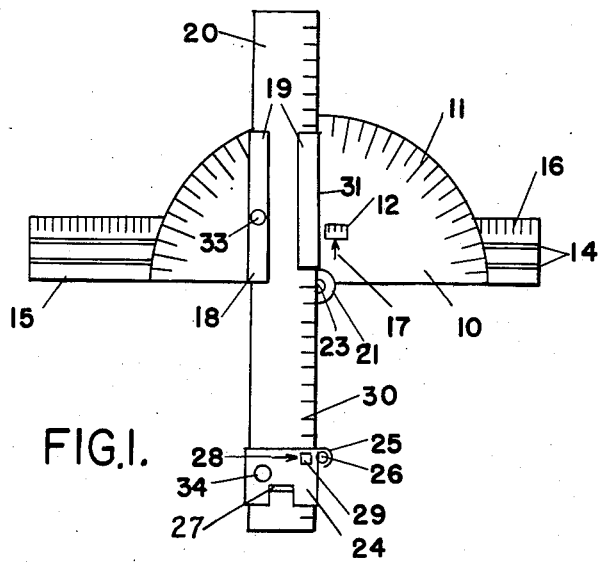
Figure 1 is a plan view of a combination protractor and compass embodying this invention.
Figure 3:
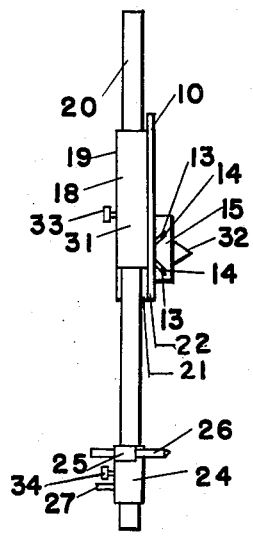
Figure 3 is a side elevation of Figure 1.
Figure 2:
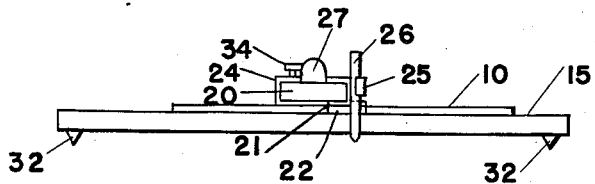
Figure 2 is a front elevation of Figure 1.

In the drawings, 10 is a base plate having graduations 11 inscribed thereon and opening 12 passing therethrough, angularly positioned fingers 13 project from the underside of the base plate 10 and are slidably attached to angular slots 14 in a straight edge 15 to keep it aligned therewith during its travels, graduations 16 are inscribed on the straight edge and are viewed through the opening 12 and aligned with the arrow 17 shown on the face of the base plate 10, a rectangular guide 18 is provided with an extension 21 on its bottom and ears 19 bent over to form a guiding and holding member for a scale 20, the extension 21 aligns with a similar extension 22 forming a part of the base plate 10 and are connected together by a flush head rivet 23, to allow the scale 20 to be rotated across the face and graduations 11, of the plate 10. The guide 18 is provided with a locking screw 33 to fasten it to scale 20. A sliding member 24 is positioned on the scale 20 and held in predetermined relationship thereto by locking screw 34, and is provided with a clip 25 to hold a piece of lead or scriber 26 when the device is used as a compass or layout member, a pusher 27 projects above the upper face of the sliding member 24 and is used to move the sliding member along the scale 20 until the arrow 28 and opening 29 are aligned with a predetermined graduation 30 shown on face of the scale 20.

In the operation of the device for use as a protractor, the base plate 10 is slid along the straight edge 15 until the selected graduation 16 appears through the opening 12 in alignment with the arrow 17, the scale 20 is rotated until the edge 31 of the rectangular guide 18 is aligned with the selected graduation 11 shown on the base plate 10. When the device is to be used as a compass, the sliding member 24 is moved along the scale 20 until the selected graduation appears through opening 29 and is aligned with arrow 28, the scale 20 is then rotated so the scriber or lead will form a circle or semi-circle. The straight edge is provided with anchoring pins 32 to hold the straight edge stationary while the scale 20 is rotated and the device is used.

While but one general form of the invention is shown in the drawings and described in the specifications, it is not desired to limit this application for patent to this particular form as it is appreciated that other forms of construction could be made that would use the same principles and come within the scope of the appended claims.

Having thus described the invention, what is claimed is:

1. The combination with a flat base plate having one edge thereof straight and having an extension projecting from the central portion of the latter, of a guide having an extension projecting from one side thereof, means pivotally connecting said extensions together, a graduated straight edge slidably mounted in said guide, a locking screw carried by said guide and engageable with said straight edge to hold the same in selected positions in said guide, a second graduated straight edge provided with parallel slots in the upper face thereof, fingers projecting from the underside of said base plate and slidably engageable with the walls of said slots to guide said base plate as it travels across said second graduated straight edge, said base plate having a second edge terminating at the edges of the first mentioned edge, said second edge being in the form of a semi-circle having its center in the axis of the means connecting said extensions together and said guide having one of the sides thereof straight and aligned with said axis, and a series of radially disposed graduations along said second edge of said base plate.

2. A combination of the type set forth in claim 1 in which said guide includes a pair of parallel ears forming with the base of said guide means for guiding and holding said first mentioned graduated straight edge.

3. A combination of the type set forth in claim 1 in which the base plate is provided with window means and a pointer cooperating with said window means to permit said base plate to be aligned with a selected one of said graduations on said first mentioned graduated straight edge.

4. A combination of the type set forth in claim 1 in which said second mentioned straight edge is provided with anchoring pins projecting from the bottom thereof to hold said second mentioned straight edge in selected position on a drawing board.

5. A combination of the type set forth in claim 1 in which a pencil carrier is adjustably mounted on said first mentioned straight edge.

References Cited in the file of this patent

UNITED STATES PATENTS

| 345,196 | Vose | July 6, 1886 |
| 982,793 | Burrage | Jan. 31, 1911 |
| 1,149,085 | Renstrom | Aug. 3, 1915 |
| 1,336,241 | La May | Apr. 6, 1920 |
| 1,443,088 | Pasquariello | Jan. 23, 1923 |
| 1,498,896 | Van de Veire | June 24, 1924 |
| 1,661,095 | Rowe | Feb. 28, 1928 |